US006834248B1

United States Patent
Green et al.

(10) Patent No.: US 6,834,248 B1
(45) Date of Patent: Dec. 21, 2004

(54) PORTABLE GAGE CALIBRATION SYSTEM AND METHOD

(75) Inventors: Craig B. Green, Maryland Heights, MO (US); Philip L. Freeman, Maryland Heights, MO (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 10/465,121

(22) Filed: Jun. 18, 2003

(51) Int. Cl.[7] .............................................. G06F 19/00
(52) U.S. Cl. ........................................ 702/104; 702/85
(58) Field of Search ........................... 702/104, 85, 91, 702/122, 123; 700/121, 179; 73/1.15, 1.16

(56) References Cited

U.S. PATENT DOCUMENTS 6,654,698 B2 * 11/2003 Nulman ....................... 702/85
2002/0165636 A1 * 11/2002 Hasan ........................ 700/121

* cited by examiner

*Primary Examiner*—Bryan Bui
(74) *Attorney, Agent, or Firm*—Black Lowe & Graham PLLC

(57) ABSTRACT

A system and method for improving gage calibration in a manufacturing environment. The system includes a gage calibration apparatus that provides remote gage calibration. The apparatus includes a gage measuring apparatus, a processor, a user interface, a scanner, and a printer. The gage measuring apparatus receives a gage and generates measurement information of the received gage. The processor is electrically coupled to the gage measuring apparatus and includes a communication component for communicating with a remotely located metrology system, and a component for determining calibration status of the gage based on the generated measurement information and predefined gage calibration information. The user interface presents the determined calibration status. The scanner scans a tag previously affixed to the gage for information pertaining to the gage and sends the gage information to the processor. The printer prints a label based on the determined calibration status and the communication component.

32 Claims, 4 Drawing Sheets

PORTABLE GAGE CALIBRATION SYSTEM AND METHOD

FIELD OF THE INVENTION

This invention relates generally to gage calibration and, more specifically, to improved gage calibration.

BACKGROUND OF THE INVENTION

In many large scale manufacturing environments there may exist thousands of measurement & test equipment items (MT&E) in active service, including thousands of gages. All gages used in production must be periodically calibrated to verify they are maintained within tolerance to ensure the quality of the products they are used to produce. Typically, gage calibration or certification occurs at a central metrology lab. When gages are due for calibration, mechanics must submit gages to a nearby tool crib. Metrology picks up gages from each tool crib periodically for transport to their lab. Typically, the lab will stockpile gages until an adequate number of units are in inventory to be cost-effectively calibrated. After calibration, the gages are transported by metrology back to the tool cribs. This process includes excessive cycle time and labor time, and excess inventory is required to support loss of gage use.

Therefore, there exists an unmet need to develop a shop-floor gage calibration or certification system for quickly and easily re-certifying gages.

SUMMARY OF THE INVENTION

The present invention is a system and method for improving gage calibration in a manufacturing environment. The system includes a gage calibration apparatus that provides remote gage calibration. The apparatus includes a gage measuring apparatus, a processor, a user interface, a scanner, and a printer. The gage measuring apparatus receives a gage and generates measurement information of the received gage. The processor is electrically coupled to the gage measuring apparatus and includes a communication component for communicating with a remotely located metrology system, and a component for determining calibration status of the gage by comparing generated measurement information to predefined gage calibration information. The user interface presents the determined calibration status. The scanner scans a tag previously affixed to the gage for information pertaining to the gage and sends the gage information to the processor. The printer prints a label based on the determined calibration status and the communication component.

In one aspect of the invention, the communication component communicates wirelessly with the metrology system over a data network.

In another aspect of the invention, the processor transmits the scanned information to the metrology system via the communication component and the metrology system identifies predefined gage calibration information based on the scanned information and transmits the identified predefined gage calibration information to the processor.

In still another aspect of the invention, a mobile cart supports the gage measuring apparatus.

BRIEF DESCRIPTION OF THE DRAWINGS

The preferred and alternative embodiments of the present invention are described in detail below with reference to the following drawings.

DETAILED DESCRIPTION OF THE INVENTION

The present invention is a portable calibration system and method that reduces gage or tool (e.g. torque wrench, wire crimpers, etc.) calibration cycle time and labor time, reduces gage inventory, and reduces gage loss. Many specific details of certain embodiments of the invention are set forth in the following description and in FIGS. 1–4 to provide a thorough understanding of such embodiments. One skilled in the art, however, will understand that the present invention may have additional embodiments, or that the present invention may be practiced without several of the details described in the following description.

Figure 1:
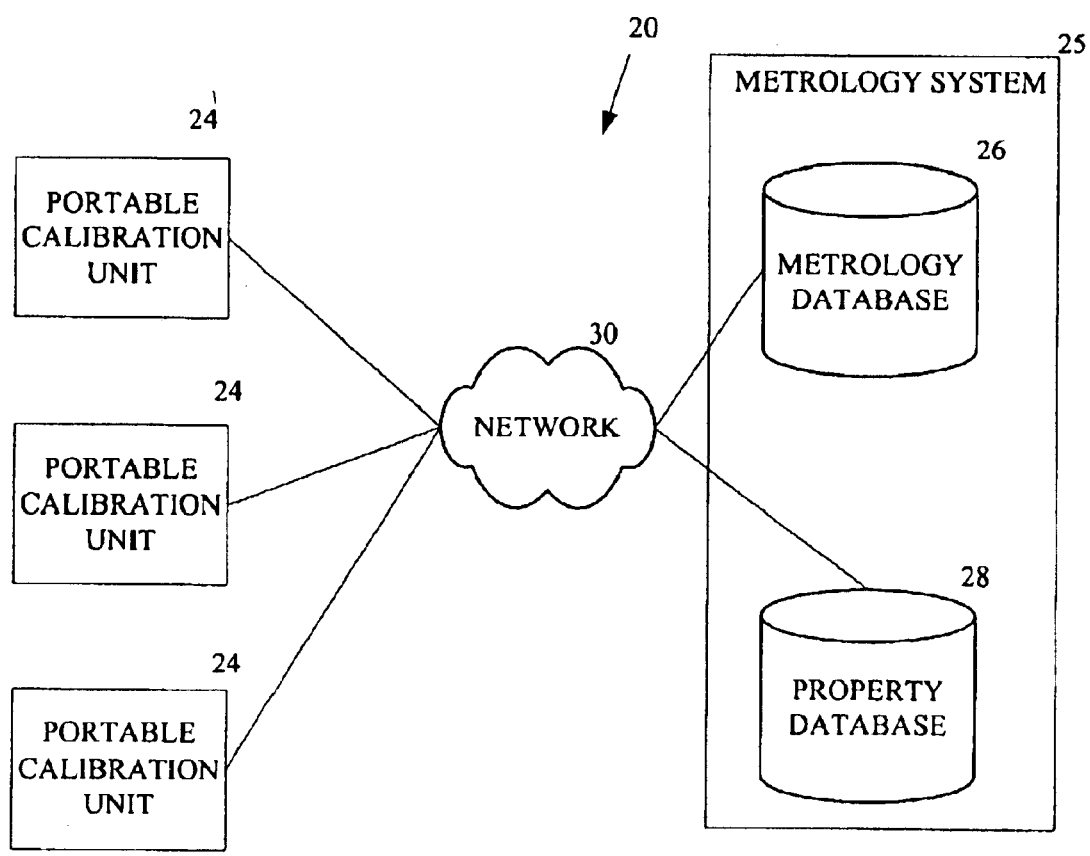
FIG. 1 is a block diagram of an example system formed in accordance with the present invention.

As shown in FIG. 1, an example calibration system 20 includes one or more portable calibration units 24, a metrology system 25 having a metrology database 26, and a property database 28. The portable calibration units 24 are suitably coupled to the metrology system 25 over a network 30, such as without limitation, a public or private data network, i.e., intranet. The portable calibration units 24 car) be located at or moved to machine shop floors or factory line floors close to where gages are being used in a production process. The portable calibration units 24 calibrate gages based on data from the metrology database 26. The property database 28 is used to track the specific gage and assignee. In one embodiment, the metrology database 26 includes predefined tolerance limits for each type of gage, a record of who and when calibration has been performed on each gage, when calibration is next required (frequency) and calibration results (e.g. measurements). The property database 28 includes information on the gage, such as purchase date, property tracking number, assignee (i.e., who the gage is checked out to).

It will be appreciated that by storing calibration history information at a central or single database, inspection audits are easier to pass.

Figure 2:
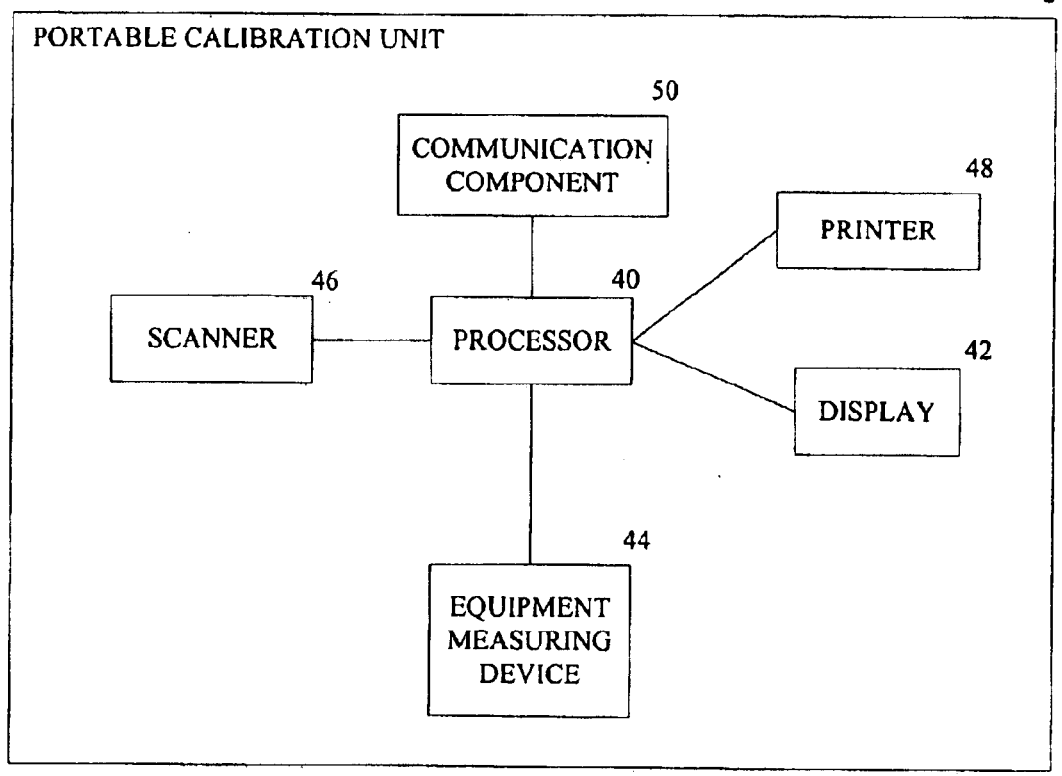
FIG. 2 is a block diagram of a portable calibration unit formed in accordance with the present invention and used in the system shown in FIG. 1.

FIG. 2 illustrates components of one of the portable calibration units 24. An example portable calibration unit 24 may include a processor 40 that is electrically coupled with a wired or wireless connection to a display 42 (the combination with the processor being a personal computer (PC)), an equipment measuring device 44, a scanner 46, a printer 48, and a communication component 50. The processor 40 communicates through the network 30 via the communication component 50. The communication component 50 communicates over a wired or wireless connection to the network 30.

Figure 3:
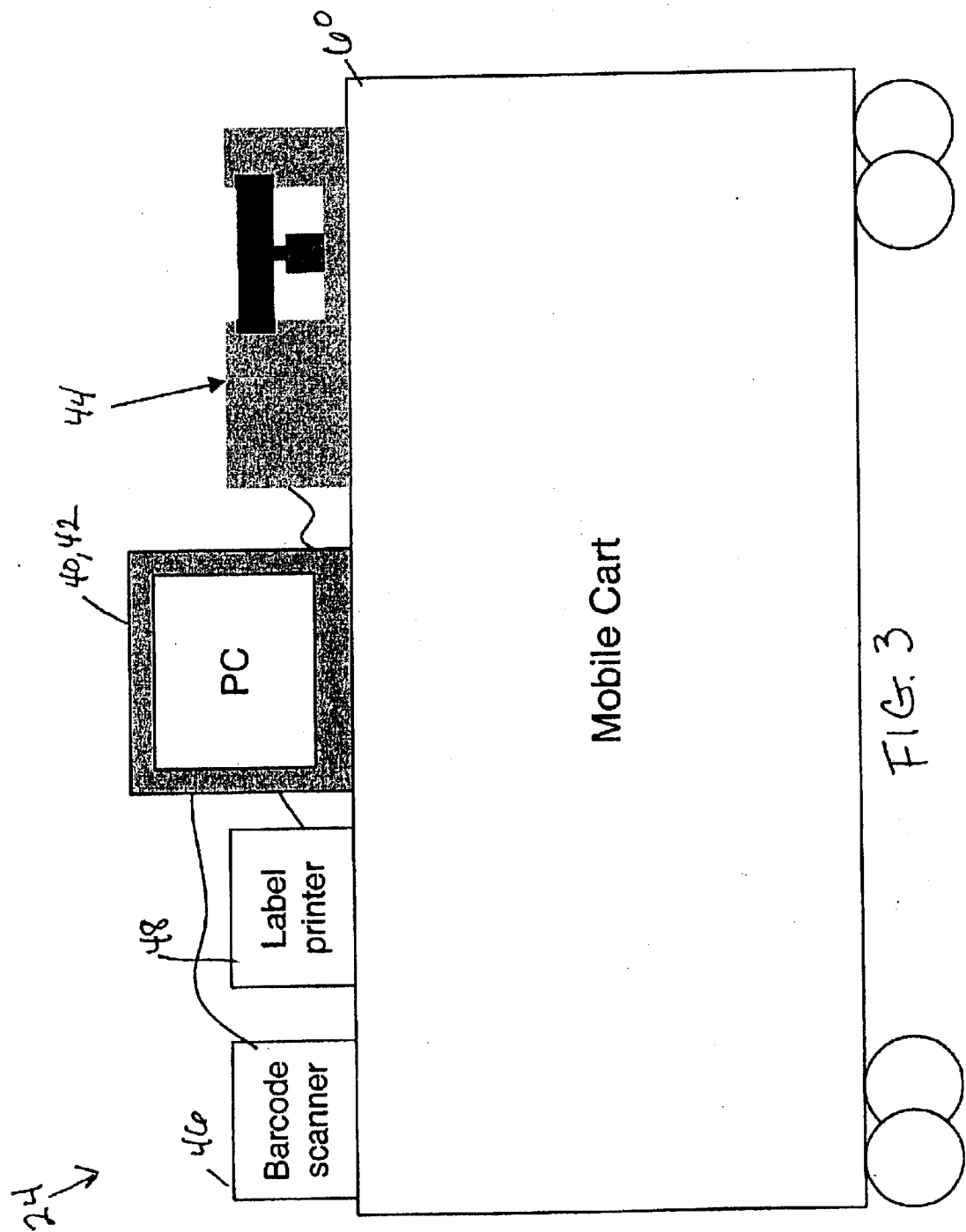
FIG. 3 is a side view of an example portable calibration unit.

As shown in FIG. 3, the components of the portable calibration unit 24 may be disposed on a mobile cart 60. The communication component 50 may communicate wirelessly with a similar wireless communication device (not shown) that is in direct communication with the network 30 and the other components that are connected to the network 30. In this embodiment, the mobile cart 60 can be moved anywhere in a factory or manufacturing facility as long as it can be linked for use with the network 30 or directly with one or both of the databases 26 and 28.

Figure 4:
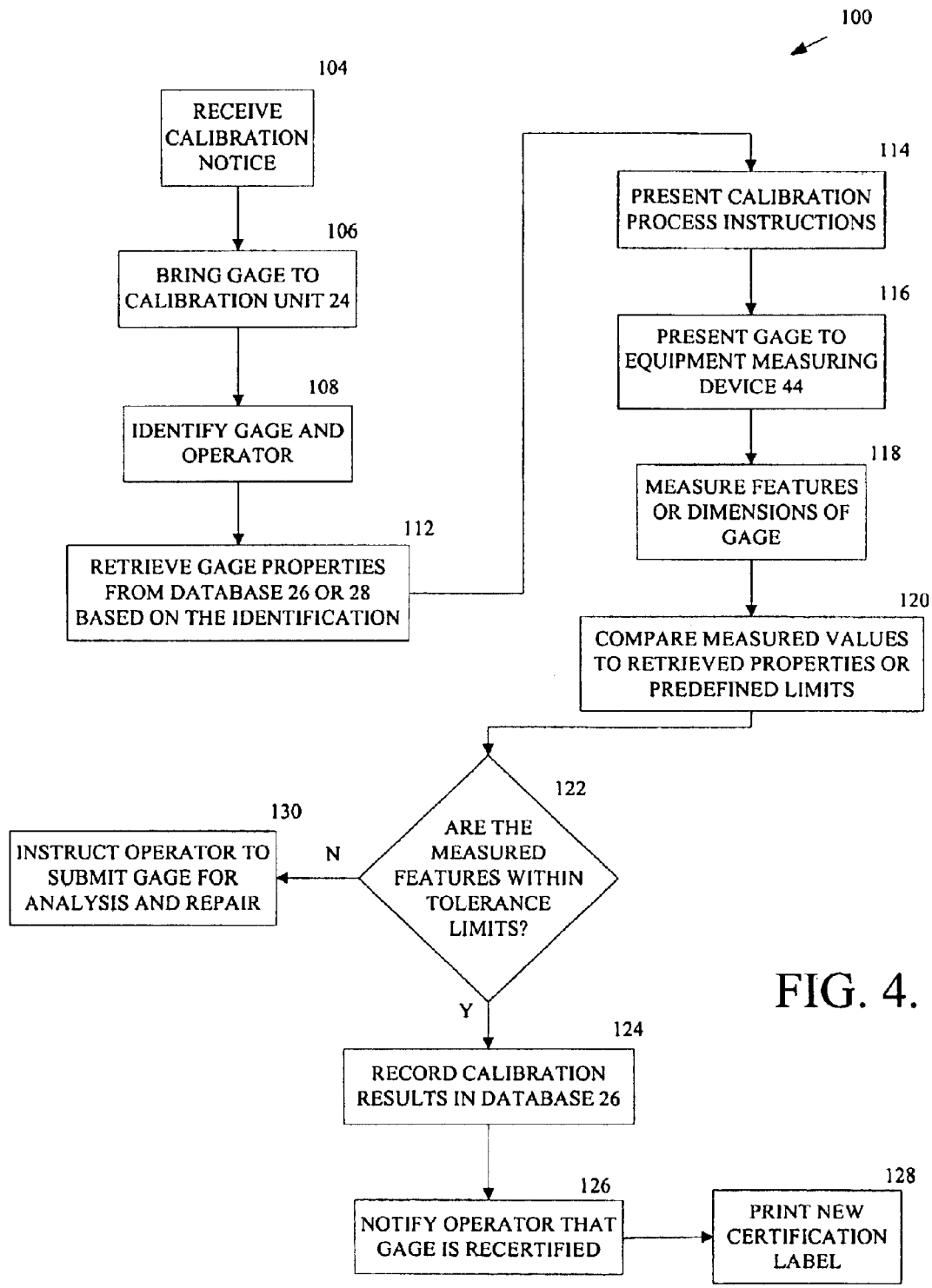
FIG. 4 is a flow diagram of an example process performed by the systems shown in FIGS. 1–3.

FIG. 4 illustrates an example process 100 performed by the system 20 shown in FIG. 1. First, at a block 104, an operator responsible for performing calibration on a gage receives a notice requiring them to calibrate a specific gage. The calibration notice may come in various formats depending upon the communication structure within a company, such as electronic mail or paper notices from a metrology unit. The calibration notice may be automatically generated by a computer-based metrology unit based on calibration history information and a calibration schedule particular to the associated gage. After the operator receives a calibration notice, at a block 106, the operator brings the gage to a portable calibration unit 24 or the portable calibration unit 24 is brought to the gage.

With continued reference to FIG. 4, at block 108, the gage is identified by the portable calibration unit 24. Identification of the gage can be performed in a number of ways. For example, a gage may include a bar code that is scanned by a bar code scanner (scanner 46) or a radio frequency identification tag that is read by a reader (scanner 46) or an identification number may be manually entered into the system 20. Also, the employee/operator performing the calibration is identified by scanning an identification badge having a barcode or RFID tag, or manually entering employee/operator information. The gage information and employee/operator information are sent to the processor 40. Next, at block 112, the processor 40 requests the properties of the gage from the metrology database 26 via the communication component 50 over the network 30 using the identification information determined at block 108. After the processor 40 receives the gage property information or gage predefined limits, the processor 40 presents calibration process instructions on the display 42 included within the gage property information at block 114. It will be appreciated that calibration process instructions can also be aurally presented to the operator via speakers (not shown) that are coupled to the processor 40. The calibration process instructions instruct the operator in performance of the gage calibration. The presented calibration process instructions depend upon the gage measurements required in order to effectively perform calibration of the gage. It will be appreciated that alternative measurement techniques, such as mechanical or acoustical, could be used.

At block 116, the operator presents the gage to the equipment measuring device 44 according to the calibration process instructions presented on the display 42. At block 118, the equipment measuring device 44 measures (e.g. optically) features or dimensions of the gage and sends those measurements to the processor 40. Next, at block 120, the processor 40 compares the measured values to the retrieved gage properties or predefined limits. If, at a decision block 122, it is determined that the measure features or dimensions are within tolerance limits of the gage properties, then, at a block 124, the processor 40 records calibration results in the metrology database 26. At block 126, the processor 40 notifies the operator that the gage has successfully passed recertification. At block 128, a new certification label is printed on the printer 48 and attached by the operator to the recalibrated gage.

If, however, at the decision block 122 the measured features or dimensions do not fall within the tolerance limits, then, at block 130, the processor 40 instructs the operator via the device 42 to submit the gage for analysis and repair at the proper facility. In either case (measured dimensions are within or out of tolerance limits), the measurement results may be stored in the metrology database 26 for historical record, auditing, or to perform statistical process control evaluations. The results stored could be in the form of "in tolerance"/"out of tolerance" (good/bad) or the actual measured values. Also, recorded information includes date/time of calibration and the operator name or employee number who performed the calibration.

While the preferred embodiment of the invention has been illustrated and described, as noted above, many changes can be made without departing from the spirit and scope of the invention. Accordingly, the scope of the invention is not limited by the disclosure of the preferred embodiment. Instead, the invention should be determined entirely by reference to the claims that follow.

What is claimed is:

1. A calibration apparatus for providing remote calibration, the apparatus comprising:
   a measuring apparatus adapted to receive at least one of a gage or tool and generate measurement information about the received gage or tool;
   a processor operatively coupled to the measuring apparatus, the processor including:
      a communication component adapted to communicate with a remotely located metrology system; and
      a status component adapted to determine a calibration status of the gage or tool based on at least one of the generated measurement information and predefined calibration information; and
   a user interface operatively coupled to the processor and adapted to present the determined calibration status,
   wherein the communication component sends the determined calibration status to the remotely located metrology system.

2. The apparatus of claim 1, wherein the communication component communicates wirelessly with the remotely located metrology system over a data network.

3. The apparatus of claim 2, wherein the remotely located metrology system is distributed over the data network.

4. The apparatus of claim 2, further comprising a scanner electrically coupled to the processor for scanning a tag previously affixed to the gage or tool for information pertaining to the associated gage or tool and sending the scanned information to the processor.

5. The apparatus of claim 4, wherein the processor identifies predefined calibration information based on the scanned information.

6. The apparatus of claim 4, wherein the processor transmits the scanned information to the metrology system via the communication component and the metrology system identifies predefined calibration information based on the scanned information and transmits the identified predefined calibration information to the processor.

7. The apparatus of claim 1, wherein the user interface includes a display device.

8. The apparatus of claim 1, further comprising a printer electrically coupled to the processor, wherein the processor includes a component for instructing the printer to print a label for the gage or tool based on the determined calibration status.

9. The apparatus of claim 1, further comprising a mobile cart for supporting the calibration apparatus, the processor, and the user interface.

10. A calibration apparatus for providing remote gage calibration, the apparatus comprising:
    a measuring apparatus for receiving at least one of a gage or tool and generating measurement information of the received gage or tool;
    a processor operatively coupled to the measuring apparatus, the processor including:
       a communication component for communicating with a remotely located metrology system; and
       a status component for determining calibration status of the gage or tool based on at least one of the generated measurement information and predefined calibration information;

a user interface operatively coupled to the processor for presenting the determined calibration status;

a scanner operatively coupled to the processor for scanning a tag previously affixed to the gage or tool for information pertaining to the gage or tool and sending the information to the processor; and a printer operatively coupled to the processor, wherein the processor includes a print component for instructing the printer to print a label based on the determined calibration status and the communication component sends the determined calibration status to the remotely located metrology system.

11. The apparatus of claim 10, wherein the communication component communicates wirelessly with the remotely located metrology system over a data network.

12. The apparatus of claim 10, wherein the processor identifies predefined calibration information based on the scanned information.

13. The apparatus of claim 10, wherein the processor transmits the scanned information to the metrology system via the communication component and the metrology system identifies predefined calibration information based on the scanned information and transmits the identified predefined gage calibration information to the processor.

14. The apparatus of claim 10, wherein the user interface includes a display device.

15. The apparatus of claim 10, further comprising a mobile cart for supporting the calibration apparatus, the processor, the user interface, the scanner, and the printer.

16. A method for performing gage calibration, the method comprising:

generating measurement information of at least one of a gage or tool;

determining calibration status of the gage or tool based on at least one of the generated measurement information and predefined calibration information;

presenting the determined calibration status; and sending the determined calibration status to a remotely located metrology system.

17. The method of claim 16, wherein sending includes wirelessly sending the determined calibration status to the remotely located metrology system.

18. The method of claim 16, further comprising scanning a tag previously affixed to the gage or tool for information pertaining to the gage or tool.

19. The method of claim 18, further comprising identifying predefined calibration information based on the scanned information.

20. The method of claim 19, further comprising transmitting the scanned information to the metrology system, wherein identifying occurs at the remotely located metrology system based on the scanned information.

21. The method of claim 16, further comprising printing a label based on the determined calibration status.

22. A method for performing calibration by a portable system, the method comprising:

scanning a tag previously affixed to at least one of a gage or tool for information pertaining to the gage or tool;

identifying predefined gage calibration information based on the scanned information;

generating measurement information of the gage or tool;

determining calibration status of the gage or tool based on at least one of the generated measurement information and the predefined calibration information;

presenting the determined calibration status;

sending the determined calibration status to a remotely located metrology system;

printing a label based on the determined calibration status; and supporting the system on a mobile cart.

23. The method of claim 22, wherein sending includes wirelessly sending the determined calibration status to the remotely located metrology system.

24. The method of claim 23, further comprising transmitting the scanned information to the metrology system, wherein identifying occurs at the remotely located metrology system based on the scanned information.

25. A system for performing calibration comprising:

a metrology system; and a calibration apparatus coupled the metrology system over a data network, the calibration apparatus comprising:

a measuring apparatus for receiving at least one of a gage or tool and generating measurement information of the received gage or tool;

a processor electrically coupled to the measuring apparatus, the processor including:

a communication component for communicating with the remotely located metrology system; and a status component for determining calibration status of the gage or tool based on at least one of the generated measurement information and predefined calibration information;

a user interface electrically coupled to the processor for presenting the determined calibration status;

a scanner electrically coupled to the processor for scanning a tag previously affixed to the gage or tool for information pertaining to the gage or tool; and a printer electrically coupled to the processor, wherein the processor includes a print component for instructing the printer to print a label for the gage or tool based on the determined calibration status and the communication component sends the determined calibration status to the remotely located metrology system.

26. The system of claim 25, wherein the communication component communicates wirelessly with the metrology system.

27. The system of claim 25, wherein the processor identifies predefined calibration information based on the scanned information.

28. The system of claim 25, wherein the processor transmits the scanned information to the metrology system via the communication component and the metrology system identifies predefined calibration information based on the scanned information and transmits the identified predefined calibration information to the processor.

29. The system of claim 25, wherein the user interface includes a display device.

30. The system of claim 25, further comprising a mobile cart for supporting the calibration apparatus.

31. The system of claim 25, wherein the remotely located metrology system includes a database for storing calibration status information and predefined calibration information.

32. The system of claim 30, wherein the remotely located metrology system includes a notice component for automatically generating a calibration notice for a gage or tool based on stored calibration status information and predefined calibration requirements and sending the generated calibration notice to one of the calibration apparatus or a previously assigned assignee.

* * * * *